June 16, 1964 V. D. HANES 3,137,312
PRESSURE REGULATOR
Filed April 30, 1962 3 Sheets-Sheet 1

FIG. I.

INVENTOR
Vaughn D. Hanes

BY *Herbert M. Birch*

ATTORNEY

June 16, 1964     V. D. HANES     3,137,312
PRESSURE REGULATOR

Filed April 30, 1962     3 Sheets-Sheet 3

INVENTOR
Vaughn D. Hanes
BY Herbert M Birch
ATTORNEY

United States Patent Office 3,137,312
Patented June 16, 1964

3,137,312
PRESSURE REGULATOR
Vaughn Dean Hanes, West Covina, Calif., assignor to Robertshaw Controls Company, a corporation of Delaware
Filed Apr. 30, 1962, Ser. No. 190,987
15 Claims. (Cl. 137—505.15)

This invention relates generally to pressure regulators for providing constant output pressures when supplied by varying supply pressure inputs and more particularly to fluid pressure regulators of the above-defined type in which a torsion member is used as the main control means therein.

It is an object of this invention to provide a pressure regulator having only a single pressure control stage, which will provide a constant regulated output pressure regardless of changes in the supply pressure applied to the inlet thereof.

Another object of this invention is to provide a pressure regulator having means therein for automatically compensating for pressure differentials within the control mechanism thereof, whereby a constant regulated output pressure is provided over a wide range of supply pressure variations.

Still another object of this invention is to provide a pressure regulator having a torsion member as the main control means therein, and means for automatically varying the action of the torsion member in response to pressure differentials within the regulator to thereby provide automatic compensation of the effects on the regulator of those pressure differentials.

These and other objects of this invention will become more apparent with reference to the following specification and drawings, which relate to a preferred embodiment of the invention.

Basically, the invention comprises a pressure input chamber, a pressure output chamber, a control valve between said inlet and outlet chambers, a first diaphragm defining one wall of said outlet chamber and coupled to the said control valve to adjustably position same in response to output pressure, a torsion member and associated control assembly for biasing the said first diaphragm to maintain the desired output pressure, and a second diaphragm and a compensating chamber defined thereby, said second diaphragm being actuated in response to the input pressure and being connected with said control assembly to automatically vary the bias exerted by said torsion member on said first diaphragm as a function of the differential pressure between said input and output pressure to thereby compensate for the forces exerted on said control valve and said first diaphragm as a result of said differential pressure.

Figure 1:
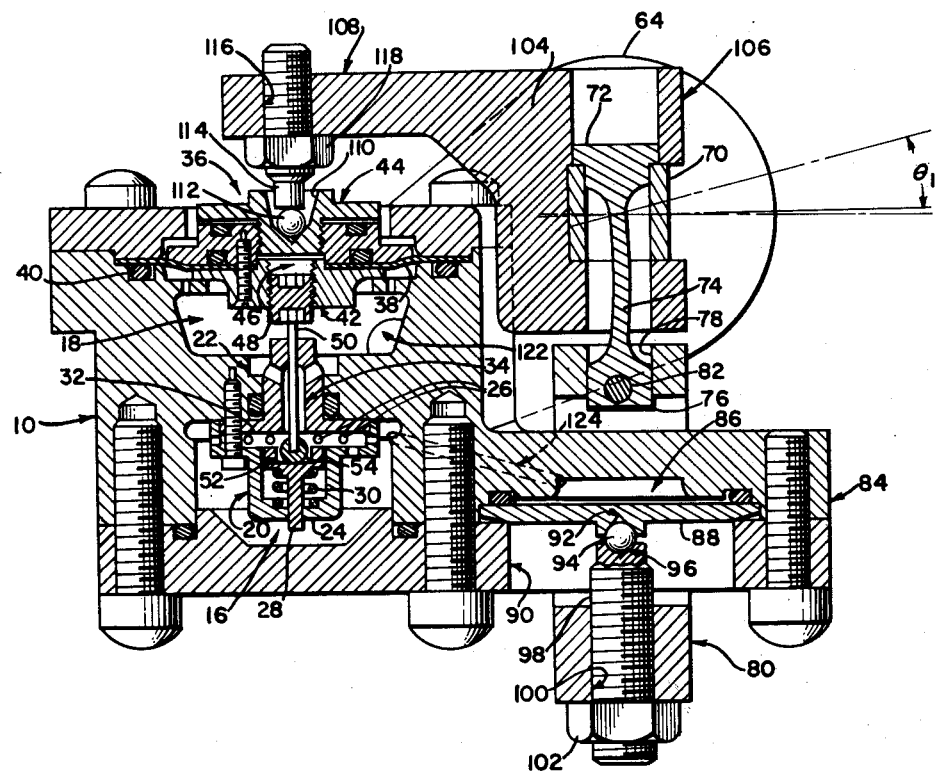
FIGURE 1 is a side elevation, in cross-section of the invention in the no-load operating position thereof.
Figure 4:
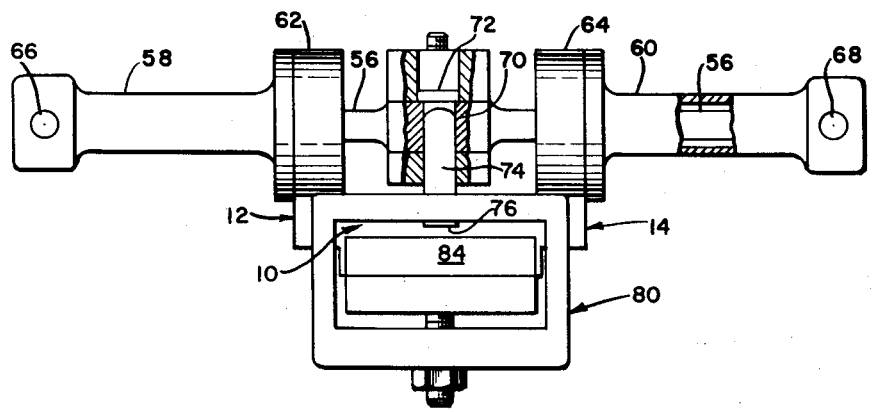
FIGURE 4 is a right end view, in partial cross-section, of FIGURES 1 and 2 and correspondingly, a left end view of FIGURE 3.

Referring in detail to the drawings, and more particularly to FIGURES 1 and 4, the pressure regulator of the present invention is shown as including a main housing 10 having an inlet port 12 and an outlet port 14 therein. The inlet port 12 communicates with a pressure input chamber 16 while the outlet port 12 communicates with a pressure output chamber 18.

The pressure input chamber 16 and the pressure output chamber 18 are interconnected through a pressure regulating control valve assembly 20 mounted in a passageway 22 between the two said chambers.

The control valve 20 is shown as comprising a fixed housing 24, having a plurality of flow ports or perforations 26 therein, enclosing a poppet valve 28 which is biased towards a closed position by a compression spring 30. The seat for the poppet valve 28 comprises that portion of the inner wall of the upper half 32 of the fixed valve housing 24 which is immediately peripheral with respect to the fluid flow passage 34 therein. The flow of pressure fluid through the passage 34, from the input chamber 16 to the output chamber 18, is thus controlled by the position of the poppet valve 28.

The outer wall of the output chamber 18 comprises a flexible diaphragm assembly 36. The diaphragm assembly 36 comprises a flexible diaphragm 38 annularly sealed at 40 between portions of the main housing 10, internal coupling means 42 for connecting the said diaphragm 38 to the control valve 20 on one side and external coupling means 44 for connecting the said diaphragm 38 to the torsion member control mechanism, the latter to be hereafter described.

The internal coupling means 42 on the diaphragm 38 comprises a threaded socket 46 for receiving the threaded base 48 of a valve actuating rod 50. The rod 50 extends from the coupling 42 through the flow passage 34 and into a re-entrant portion 52 in the poppet valve 28. A ball-shaped thrust bearing 54 is provided on the end of the actuating rod 50. Thus, movement of the diaphragm 38 causes the actuating rod 50 and the compression spring 30 to constrain the poppet valve 28 to follow the motion of the said diaphragm 38.

The control mechanism is shown in FIGURES 1 and 4 as comprising a torsion rod 56 housed and mounted internally and concentric with a pair of separated, co-axial tubular housings 58 and 60 integral with and extending laterally from respective ear-shaped, parallel, upstanding support members 62 and 64. A corresponding pair of anchoring pins 66 and 68, respectively, are provided in the outer ends of the tubular torsion rod housings 58 and 60 which pass through the respective outer ends (not shown) of the torsion rod 56 to anchor the ends thereof within the said tubular housings.

Located centrally of the torsion rod 56 is a bifurcated portion 70 in which is held the enlarged upper head portion 72 of a substantially vertically extending flexible tension link 74.

The enlarged lower head portion 76 of the tension link 74 is enclosed, as shown in FIGURES 1, 2, 3 and 4, in a socket 78 in the upper periphery of a stirrup link 80. The tension link 74 is secured in the socket 78 in the stirrup 80 by means of a retaining pin 82 which extends through the lower head 76 of the tension link and is bridged across the said socket 78.

The stirrup link 80 is of sufficient size to completely encircle a stepped-down housing extension 84 of the main housing 10, which is extended from that portion of the main housing 10 enclosing the pressure input chamber 16.

Within the housing extension 84 is a pressure compensating chamber 86 having the lower outer wall thereof defined by a second flexible diaphragm 88. The diaphragm 88 is exposed through an opening 90 in the lower half of the housing extension 84.

In the center of the diaphragm 88 is mounted an external bearing socket 92 which is adapted to receive a ball-shaped thrust bearing 94. The thrust bearing 94 is mutually received by a second bearing socket 96 on the upper end of a substantially vertically disposed diaphragm motion transmitting link 98 which is adjustably mounted in the lower portion of the stirrup link 80. The transmitting link 98 comprises a threaded bolt-like member threadbly received in an internally threaded socket 100 in the said lower portion of the stirrup link 80. A lock nut 102 is provided to secure the transmitting link 98 in the socket 100 after its desired adjusted position has been achieved. The foregoing combination, being connected to the torsion rod via the stirrup link 80 and tension link 74, provides a means whereby a compensating movement is imparted to the torsion bar 56 at the bifurcated portion 70 thereof to thereby change the bias on the pressure regulating lever to be hereinafter described.

The pressure regulating lever 104 comprises a bifurcated or forked end portion 106 which partially encloses the bifurcated portion 70 of the torsion bar 56 as well as the upper head portion 72 of the tension link 74. The remainder of the pressure regulating lever 104 comprises an elongated control arm 108 extending across the housing 10 above the pressure regulating diaphragm assembly 36, in the pressure output chamber 18, to a position above and closely adjacent the external coupling means 44 of the said diaphragm assembly 36.

The external coupling means includes a plate having a bearing socket 110 therein centrally located with respect to the regulating diaphragm 38. A ball-shaped thrust bearing 112 is retained in the socket 110. The motion of the diaphragm 38 and its external coupling 44 is transmitted via a substantially vertically extending motion transmitting link 114, which engages the thrust bearing 112, mounted in the outer end of the control arm 108 of the regulating lever 104.

The upper end of the motion transmitting link 114 is threadably and adjustably mounted in an internally threaded socket 116 in the control arm 108. A lock nut 118 is provided whereby the link 114 may be locked in place after the desired adjusted position thereof has been achieved.

Figure 2:
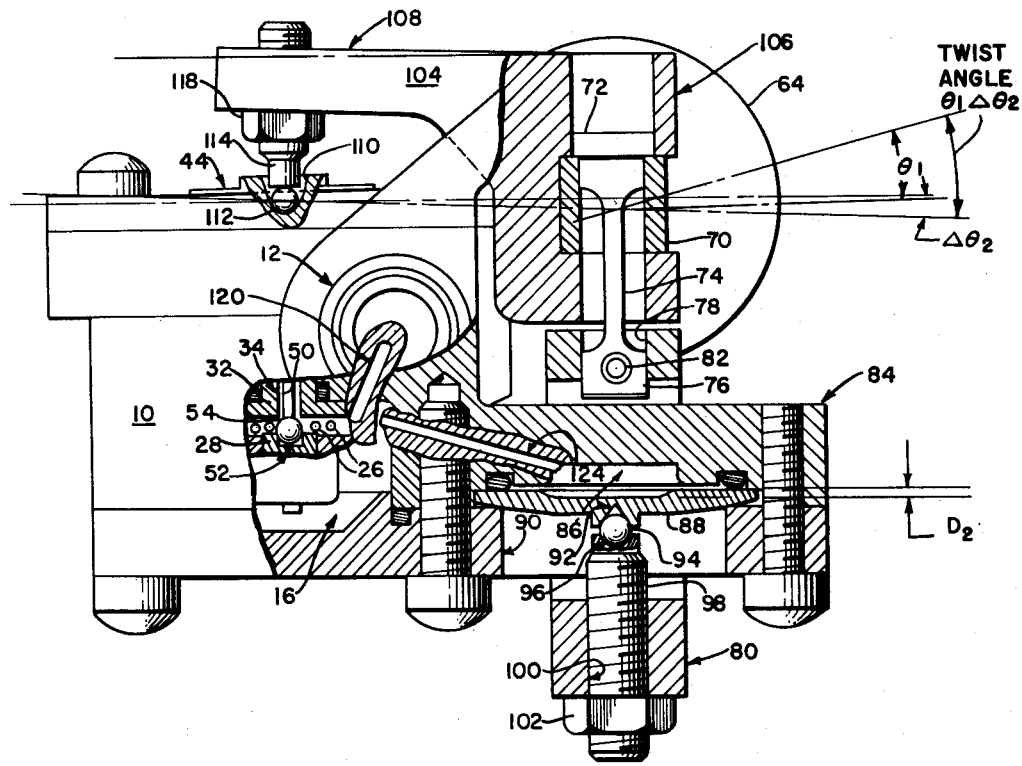
FIGURE 2 is a side elevation, in partial cross-section, of the invention in one of its operating positions.
Figure 3:
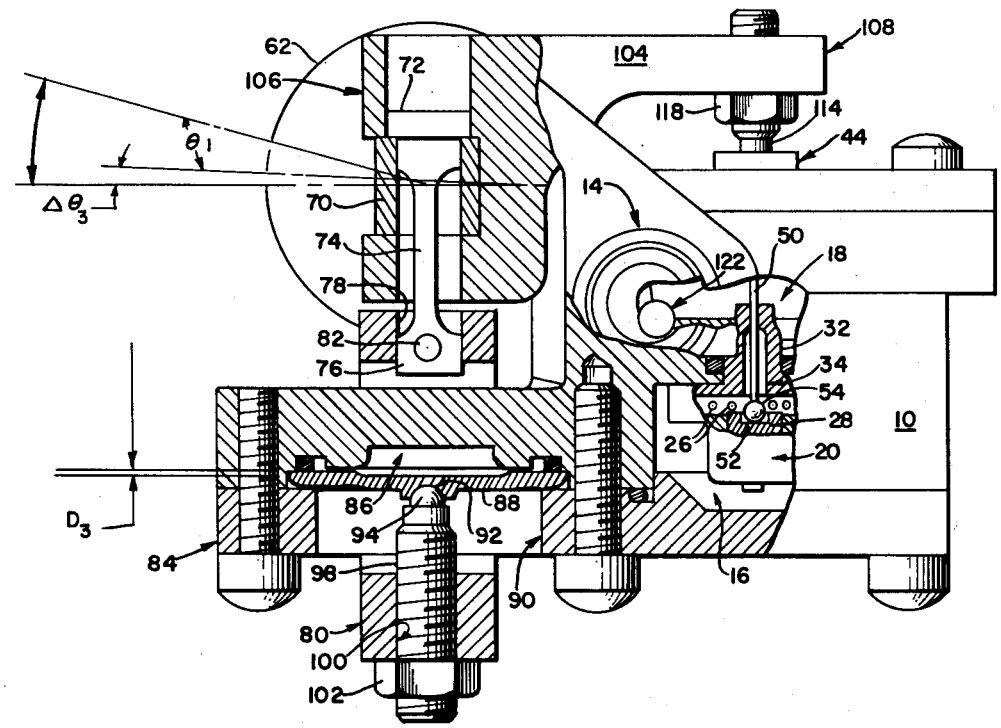
FIGURE 3 is a side elevation, in partial cross-section, of the opposite side of the invention in another of its operating positions.

Referring now to FIGURES 2 and 3 in addition to FIGURE 1, the inlet port 12 (FIGURE 2) is shown to be in communication with the input chamber 16 via a flow passage 120; the outlet port 14 is fed from the pressure output chamber 18 via a flow passage 122; and the compensating chamber 86 is in communication with the input chamber 16 via a flow passage 124.

*Operation*

As shown in FIGURE 1, which represents the unloaded position of the pressure regulator and its control means, the torsion rod 56, via the bifurcated portion 70 thereof, is initially twisted about its longitudinal axis through a predetermined start angle $\theta_1$ which supplies, through the control arm 106 of the regulator lever 104 and the transmitting link 114, a predetermined constant biasing force, determined by the torque characteristics of the torsion rod 56, to the external coupling means 44 of the regulator diaphragm assembly 36. Thus, with no pressure being supplied to the inlet port 12 and the input and output chambers 16 and 18, respectively, the result of the bias is to depress the regulator diaphragm assembly to its lowermost limit.

In this position, the internal coupling means 42 acts to drive the valve actuating rod 50 down against the poppet valve 28 in the regulator control valve assembly 20, to thereby bias the control valve 20 to its maximum open position.

Under the presently defined conditions there is no pressure in the compensating chamber 86 and thus, the compensating diaphragm 88 is in an undistorted position as shown. By proper adjustment of the motion transmitting link 98, the stirrup link 80 is positioned with respect to the presently undistorted diaphragm 88 such that the tension link 74 thereon will constrain the torsion rod 56, via the bifurated portion 70 thereof, whereby the central or longitudinal axis of the torsion rod 56 will assume a predetermined no load position with respect to the rest of the regulator assembly.

Referring now to FIGURE 2, and initially ignoring the existence of the compensating chamber and diaphragm 86 and 88, respectively, and assuming now that the inlet port 12 is connected with a source of supply pressure (not shown), the resultant flow of pressure fluid through the inlet flow passage 120, into the input chamber 16, and through the control valve 20 and flow passage 22 into the output chamber 18 causes the pressure to build up in the output chamber 18 and force the regulator diaphragm assembly 36 upward against the bias imparted thereto by the torsion rod 56 and its associated assembly. When the diaphragm assembly is positioned such that the pressure in the output chamber 18 exerts a force against the regulator diaphragm 38 which is equal and opposite to the biasing force exerted thereon via the torsion rod 56 and the regulator lever 104, the diaphragm assembly 36 will stop and the instantaneous output pressure delivered from the output chamber 18 through the output flow passage 122 to the outlet port 14 will be the desired regulated output value of the pressure regulator.

Subsequently, any variation in supply pressure will cause a corresponding change in the pressure in the input and output chambers 16 and 18 respectively. Thus, the current position of the regulator diaphragm assembly 36 and the associated position of the control valve 20 will cause a change in the internal force opposing the external force applied by torsion rod 56 and regulator lever 104 to the regulator diaphragm assembly 36 and the said assembly will be driven, along with the poppet valve 28 in the control valve 20, to a new equilibrium position wherein the said forces will be equalized and the output pressure will again be constrained to the desired regulated value.

The foregoing operation as described with respect to FIGURE 2 is theoretically, rather than practically, defined. In practice, another internal load or force, in addition to that already described, is placed upon the regulator diaphragm assembly 36 by the pressure defferential between the input and output chamber pressures applied across the poppet valve 28 in the control valve 20 and thus applied to the said diaphragm assembly 36 via the valve actuating rod 50.

Figure 5:
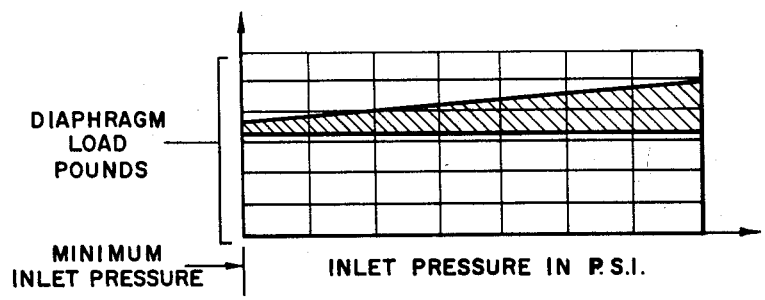
FIGURE 5 is a load chart illustrating the operating characteristics of the invention.

This additional force varies in direct proportion to the magnitude of the pressure differential between the input and output chamber 16 and 18, respectively. Consequently, since the torsion rod 56 and its regulator lever 104 apply a constant external force to the regulator diaphragm and since the opposing internal force is the sum of the regulated pressure load on the regulator diaphragm 38 plus the differential pressure load on the poppet valve 28, the resulting regulated pressure would be a variable rather than a constant due to the linear variation of the differential pressure load on the poppet valve 28 with corresponding variations in the input (supply) pressure. This effect is exemplified in the chart of FIGURE 5 wherein the regulator diaphragm load is shown to steadily increase with an increase in input (supply) pressure over the control range of the regulator. The horizontal line represents the constant load which the torsion rod 56 and regulator lever 104 supply which is theoretically sufficient to achieve constant regulated output pressure over the control range of the regulator. The line above this, with the positive slope, shows the variable force needed in practice to compensate for both the regulated pressure lead and the hereinbefore described differential pressure load on the poppet valve 28 in the control valve assembly 20.

Thus, without compensation, the actual regulated output pressure will increase or decrease as an inverse function of changes in input pressure, with an order of magnitude determined by the said differential pressure load.

The purpose of the compensating chamber 86, compensating diaphragm 88, motion transmitting link 98, stirrup link 80 and tension link 74 having now been made apparent by the foregoing discussion, the operation of this combination of elements will now be described.

Referring particularly to FIGURE 2, assume that the supply pressure to the inlet port 12 and the resulting pressure in the input chamber 16 have increased to a point wherein the regulator is operating in the upper portion of its pressure range. This increase inlet pressure and the corresponding increase in the pressure in the input chamber 16 is reflected, via the flow passage 124, in the compensating chamber 86.

The compensating diaphragm 88 is chosen for a predetermined spring rate which will produce a proportional compensating downward displacement $D_2$ thereof in response to the magnitude of the said inlet pressure. The downward movement of the compensating diaphragm 88 acts, through the thrust bearing 94 and the motion transmitting link 98, to force the stirrup link 80 through the same displacement $D_2$, whereby the tension link 74, acting on the bifurcated portion 70 of the torsion rod 56, causes the center of the longitudinal axis of the torsion bar 56 to be displaced downwardly in the same amount.

The bending stresses thus imparted to the torsion rod 56 by the tension link 74 and the resulting increased angular twist $\Delta \theta_2$ imparted thereto, by the interaction of the regulator diaphragm assembly 36 and the control arm 108 of the regulator lever 104, change the characteristics of the torsion rod 56 whereby the force imparted thereby, via the regulator lever 104, to the said diaphragm assembly 36 is increased in sufficient magnitude to directly and equally oppose the differential pressure load from the control valve 20 acting on the diaphragm assembly 36. Thus, the diaphragm assembly 36 acts to fix the position of the poppet valve 28 in the control valve 20 as a sole function of regulated pressure load, the differential pressure load having been fully compensated by the action of the compensating diaphragm 88 on the torsion rod 56 via the stirrup link 80 and tension link 74.

For yet another value of inlet pressure which, for example, is less than that causing the regulator to assume the operating position of FIGURE 2, the compensating diaphragm 88, as shown in FIGURE 3, will be displaced a lesser distance $D_3$. The resulting downward displacement of the center of the torsion rod 56 and the corresponding twist $\Delta \theta_3$ imparted thereto as a result of the said displacement will, consequently, be of a lesser magnitude than in the case of FIGURE 2, whereby the compensating force applied to the regulator diaphragm assembly 36 thereby, via the regulator lever 104, will be equal and opposite to the lesser differential pressure load acting on the said diaphragm assembly 36 resulting from the said lesser input pressure. Thus, the control valve 20 will again be adjustably positioned as a sole function of regulated pressure load and the output pressure will remain constant.

As can be seen from the foregoing specification and drawings, this invention provides a highly stable and novel fluid pressure regulator for providing constant output pressure over a wide range of input pressures.

It is to be understood that the embodiments shown and described herein are for the purpose of example only and are not intended to limit the scope of the appended claims.

What is claimed is:

1. A fluid pressure regulator comprising a pressure input chamber having a source of variable input pressure connected thereto, a pressure output chamber, a pressure control valve interconnecting said chambers, a first flexible diaphragm assembly defining one wall of said output chamber and coupled with said control valve to adjustably position said valve in response to the pressure in said output chamber, said control valve acting against said diaphragm assembly, in augmentation of the effect of said output pressure thereon, with a force directly proportional to the pressure differential between said input and said output pressure, a torsion member having a predetermined twist imparted thereto, a regulator lever mounted on said torsion member and extending therefrom to an external coupling on said first diaphragm assembly to apply a force thereto, determined by the characteristics of said torsion member, in opposition to the force exerted thereon from within said output chamber to thereby tend to maintain a constant output pressure in said output chamber, a compensating chamber interconnected with said input chamber and having one wall thereof defined by a second flexible diaphragm means, and coupling means interconnecting said second diaphragm means with said torsion member, said second diaphragm means being displaceable in predetermined proportion to said input pressure and acting through said coupling means to vary the characteristics of said torsion member, whereby the resulting force exerted by said regulator lever on said first diaphragm is augmented to equally and oppositely oppose the force exerted thereon by said control valve to thereby maintain a constant bias on said diaphragm and a constant pressure in said output chamber.

2. The invention defined in claim 1, wherein said control valve comprises a flow passage between said input and said output chamber, a spring biased poppet valve in said input chamber biased to close said flow passage, and an actuating rod, connected with said first diaphragm, extending through said flow passage into engagement with said poppet valve whereby said poppet valve is constrained to follow the motion of said first diaphragm in response to pressure changes.

3. The invention defined in claim 1, wherein said torsion member comprises a torsion rod fixed at both ends adjacent said first diaphragm assembly and having a bifurcated central portion, and wherein said regulator lever comprises a bifurcated end portion engaging said bifurcated central portion of said torsion rod, an elongated control arm extending from a first point above said torsion rod to a second point above said first diaphragm assembly and a first motion transmitting link extending from said second point on said control arm to said external coupling on said first diaphragm assembly.

4. The invention defined in claim 3, wherein the length of said first motion transmitting link is selectively adjustable.

5. The invention defined in claim 1, wherein said torsion member comprises a torsion rod fixed at both ends adjacent said first diaphragm assembly and having a bifurcated central portion, and wherein said regulator lever comprises a bifurcated end portion engaging said bifurcated central portion of said torsion rod, an elongated control arm extending from a first point above said torsion rod to a second point above said first diaphragm assembly and a first motion transmitting link extending from said second point on said control arm to said external coupling on said first diaphragm assembly; and further wherein said coupling means interconnecting said second diaphragm means in said compensating chamber with said torsion rod comprises tension means for applying a bending force to said torsion rod at the said bifurcated central portion thereof by constraining said bifurcated portion to follow the motion of said second diaphragm means.

6. The invention defined in claim 5, wherein said tension means comprises a tension link suspended from said bifurcated central portion of said torsion rod, a stirrup link suspended from said tension link and encircling said compensating chamber, and a second motion transmitting link on said stirrup link extending therefrom into engagement with said second diaphragm means.

7. The invention defined in claim 6, wherein the length of said second motion transmitting link is selectively adjustable.

8. In a fluid pressure regulator including an elongated torsion rod for supplying a predetermined constant bias force for a pressure regulating assembly therein, said force being effected by imparting a predetermined twist to the central portion of said rod while the ends thereof are held fixed, means for varying said bias force in response to an input variable comprising sensing means for said input variable, output means actuated by said sensing means to produce a displacement characteristic of said input variable and coupling means between said output means and said central portion of said torsion rod to impart said displacement thereto, whereby a bending force will be imparted to said rod and said bias force will be varied in proportion to said displacement.

9. The invention defined in claim 8, wherein said sensing means comprises a pressure sensing chamber positioned substantially vertically below said torsion rod, said output means comprises a flexible diaphragm means defining one wall of said chamber and being substantially parallel with the said torsion rod and said coupling means comprises a tension linkage between said diaphragm and said central portion of said rod.

10. The invention defined in claim 8, wherein said sensing means comprises a pressure sensing chamber positioned substantially vertically below said torsion rod, said output means comprises a flexible diaphragm means defining one wall of said chamber and being substantially parallel with the said torsion rod and wherein the said coupling means comprises a tension link suspended from said central portion of said torsion rod, a stirrup link suspended from said tension link and encircling said sensing chamber and a motion transmitting link on said stirrup link extending into engagement with said diaphragm.

11. The invention defined in claim 10 wherein the length of said motion transmitting link is selectively adjustable.

12. In a fluid pressure regulator including an elongated torsion rod for supplying a predetermined constant bias force for a pressure regulating assembly therein, said force being effected by imparting a predetermined twist to the central portion of said rod while the ends thereof are held fixed, a regulating lever fixed on said central portion of said rod and extending substantially perpendicular therefrom to said pressure regulating assembly whereby said bias force is applied to said regulating assembly by means of the torque applied to said lever by said torsion rod, and means for varying said bias force in response to an input variable comprising sensing means for said input variable, output means actuated by said sensing means to produce a displacement characteristic of said input variable and coupling means between said output means and said central portion of said torsion rod to impart said displacement thereto, whereby a bending force will be imparted to said rod and said bias force will be varied in proportion to said displacement.

13. The invention defined in claim 12, wherein said sensing means comprises a pressure sensing chamber positioned substantially vertically below said torsion rod, said output means comprises a flexible diaphragm means defining one wall of said chamber and being substantially parallel with the said torsion rod and said coupling means comprises a tension linkage between said diaphragm and said central portion of said rod.

14. The invention defined in claim 12, wherein said sensing means comprises a pressure sensing chamber positioned substantially vertically below said torsion rod, said output means comprises a flexible diaphragm means defining one wall of said chamber and being substantially parallel with the said torsion rod and wherein the said coupling means comprises a tension link suspended from said central portion of said torsion rod, a stirrup link suspended from said tension link and encircling said sensing chamber and a motion transmitting link on said stirrup link extending into engagement with said diaphragm.

15. The invention defined in claim 12, wherein the length of said motion transmitting link is selectively adjustable.

References Cited in the file of this patent

UNITED STATES PATENTS

| | | |
|---|---|---|
| 1,408,923 | Bastian | Mar. 7, 1922 |
| 1,450,236 | Anderson | Apr. 3, 1923 |
| 2,651,147 | Eichelman | Sept. 8, 1953 |